US006800230B2

(12) United States Patent
Ishikawa et al.

(10) Patent No.: US 6,800,230 B2
(45) Date of Patent: Oct. 5, 2004

(54) DISK BRAKE PISTON SEAL MEMBER AND ITS MANUFACTURING METHOD

(75) Inventors: Yoshimi Ishikawa, Saitama (JP); Hirofumi Noro, Saitama (JP); Shinichi Kuwahara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 340 days.

(21) Appl. No.: 10/087,753

(22) Filed: Mar. 5, 2002

(65) Prior Publication Data

US 2002/0092712 A1 Jul. 18, 2002

Related U.S. Application Data

(62) Division of application No. 09/651,118, filed on Aug. 30, 2000, now abandoned.

(30) Foreign Application Priority Data

Aug. 30, 1999 (JP) ........................................... 11-242601

(51) Int. Cl.[7] ............................ B05D 7/22; B26D 3/16; B29C 69/00

(52) U.S. Cl. ....................... 264/130; 264/159; 264/269; 264/297.1; 264/300; 427/230; 427/236

(58) Field of Search ................................ 264/130, 159, 264/269, 297.1, 300; 427/230, 236

(56) References Cited

U.S. PATENT DOCUMENTS 3,186,521 A 6/1965 Chowings
3,860,095 A 1/1975 Morris
4,723,350 A * 2/1988 Kobayashi et al. ........... 29/417
4,809,821 A 3/1989 Fulmer
5,277,279 A 1/1994 Shimura
6,164,422 A 12/2000 Sanitate et al.

FOREIGN PATENT DOCUMENTS

JP 60120041 A * 6/1985 ................. 264/159
JP 60120042 A * 6/1985 ................. 264/159
JP 60141779 A * 7/1985
JP 63160811 A * 7/1988
JP 63-180732 A 7/1988
JP 11 63047 A 3/1999

* cited by examiner

*Primary Examiner*—Leo B. Tentoni
(74) *Attorney, Agent, or Firm*—Birch, Stewart, Kolasch & Birch, LLP

(57) ABSTRACT

To stabilize a friction coefficient of a dust seal member or brake-gap adjustment seal member to a piston in a disc brake regardless of temperature change. At least an inner circumferential surfaces of a dust seal member and a brake-gap adjustment seal member, attached to a brake caliper, are coated with a friction reducing agent.

9 Claims, 2 Drawing Sheets

12,13
15
14
14

DISK BRAKE PISTON SEAL MEMBER AND ITS MANUFACTURING METHOD

CROSS-REFERENCE TO RELATED APPLICATIONS

The present application is a Divisional Application of U.S. application Ser. No. 09/651,118, filed on Aug. 30, 2000 (now abandoned), and claims priority under 35 U.S.C. §119 to Japanese Patent Application No. Hei 11-242601, filed Aug. 30, 1999, the entire contents of which are hereby incorporated by reference.

BACKGROUND OF THE INVENTION

1. Field of the Invention

The present invention relates to a disc brake piston seal member, attached to a ring-shaped groove formed on an inner circumferential surface of a cylinder hole of a brake caliper, in a slidable and close contact with an outer circumferential surface of a piston slidably engaged with the cylinder hole, and a method for manufacturing the seal member.

2. Description of Background Art

In a disc brake, if hardness and fastening allowance of a piston seal member change in accordance with temperature change, a friction coefficient of the piston seal member to the piston changes, consequently, a seal characteristic, brake-gap adjustment characteristic and the like of the piston seal member may be degraded.

Accordingly, to always stabilize the friction coefficient between the piston and the piston seal member regardless of temperature change, it is conventional to form a plate layer with a low friction coefficient on the outer circumferential surface of the piston (See, e.g., JP-A No. H11-63047).

However, to form a plate layer with a low friction coefficient on the outer circumferential surface of the piston as described above, a comparatively-troublesome plating processing is required. Further, as the plating processing must be performed on the entire outer circumferential surface of the piston, the costs of the disc brake increases.

The present invention has been made in view of the above situation, and has its object to provide a disc brake piston seal member and its manufacturing method capable of stabilizing the friction coefficient to the piston without an increase in cost.

SUMMARY AND OBJECTS OF THE INVENTION

To attain the above object, the present invention provides as its first aspect a disc brake piston seal member, attached to a ring-shaped groove formed on an inner circumferential surface of a cylinder hole of a brake caliper, in a slidable and close contact with an outer circumferential surface of a piston slidably engaged with said cylinder hole, wherein at least the inner circumferential surface, in close contact with the outer circumferential surface of said piston, is coated with a friction reducing agent.

Note that the piston seal member corresponds to a dust seal member 12 and a brake-gap adjustment seal member 13 in an embodiment of the present invention to be described later, and the ring-shaped groove corresponds to first and second ring grooves 10 and 11 in the embodiment of the present invention to be described later.

According to the first aspect, even if the hardness and fastening allowance of the piston seal member change due to temperature change, the friction coefficient of the seal member to the piston can be stabilized. Accordingly, if this piston seal member is a dust seal member, its seal function can always be normally performed, and the sliding resistance of the piston can be reduced Further, if the piston seal member is a brake-gap adjustment seal member, the roll back amount of the seal member upon withdrawal of the piston can always be constant, thus the brake-gap adjustment function can be stabilized.

Further, the coating of the friction reducing agent can be performed only in an extremely small region, i.e., the inner circumferential surface of the piston seal member, and can be easily performed by brush-coating, spray coating or the like, the increase in the costs of the disc brake by this coating is extremely small.

Further, the present invention provides, as a second aspect, upon the manufacture of the disc brake piston seal member, a coating of an inner circumferential surface of a cylindrical seal material with the friction reducing agent; and cutting said seal material into ring pieces, thus manufacturing multiple piston seal members.

According to the second aspect, multiple piston seal members coated with the friction reducing agent on their inner circumferential surfaces can be efficiently manufactured. Especially, as the coating of the friction reducing agent can be performed only once per one seal material, the increase in the costs of the disc brake by the coating is further extremely small.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A working example of the present invention will be described in accordance with an embodiment of the present invention as shown in attached drawings.

Figures 1A, 1B:
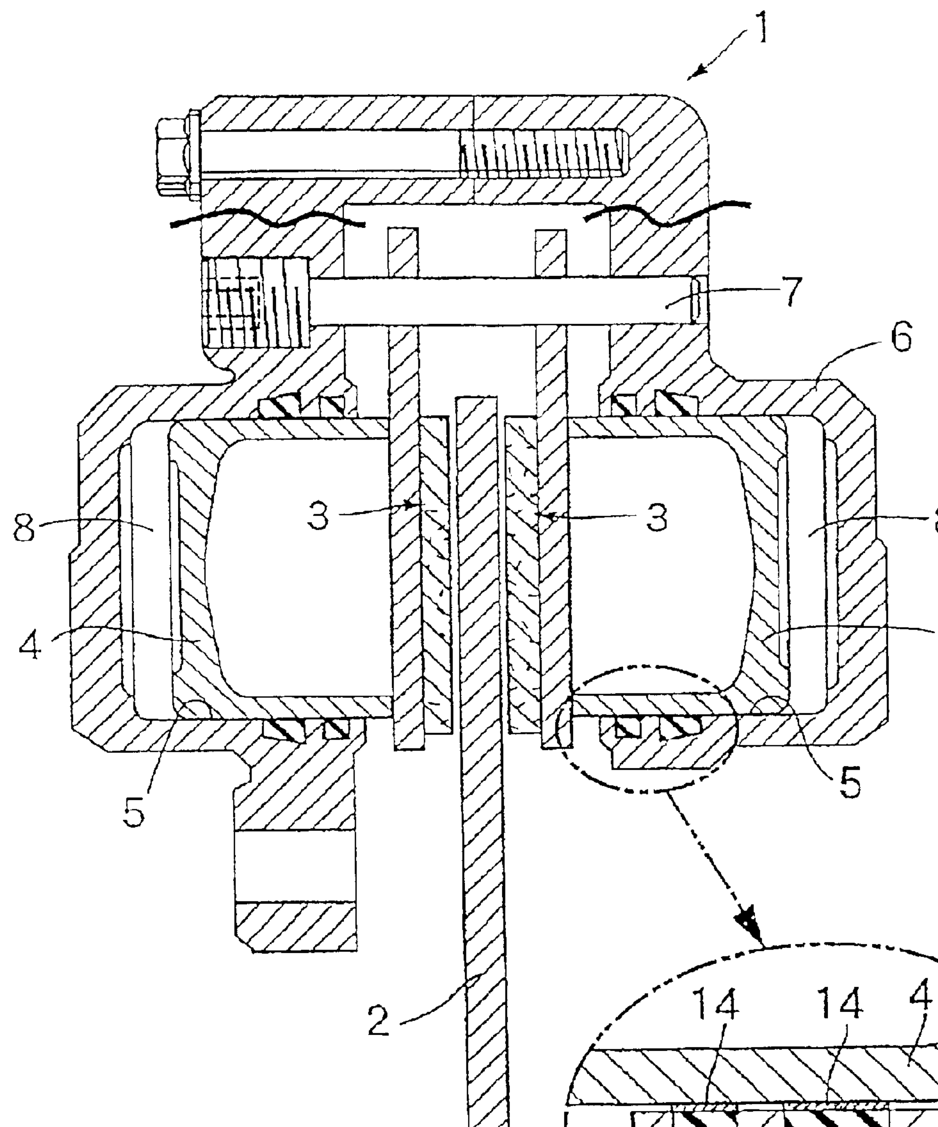
FIG. 1(A) is a vertical cross-sectional front elevation of the disc brake according to the embodiment of the present invention.
FIG. 1(B) is an enlarged view of a portion of FIG. 1(A), FIGS. 2(A)–2(C) are explanatory views showing the manufacturing processes of the dust seal member and the brake-gap adjustment seal member in the above disc brake.

First, a disc brake 1 having, a piston seal member of the present invention will be described with reference to FIGS. 1(A) and 1(B). The disc brake 1 has a brake disc 2 fixed to a side surface of a hub of a wheel (not shown), a pair of friction pads 3, 3 provided on left and right side surfaces of the brake disc 2, a pair of pistons 4, 4 to press the friction pads 3, 3 against the brake disc 2, and a brake caliper 6, having cylinder holes 5, 5 with bottoms respectively slidably engaged with the pistons 4, 4, fixed to a vehicle body (not shown). The friction pads 3, 3 are slidably supported along an axial direction of the pistons 4, 4, by the brake caliper 6 via a hanger pin 7. In the respective cylinder holes 5, hydraulic chambers 8 are formed with the respective pistons 4. Both of the hydraulic chambers 8, 8 communicate with an output port of a master cylinder (not shown), and are supplied with hydraulic pressure by the operation of the master cylinder.

A first ring groove 10 having a square cross section is provided on the inner circumferential surface of each cylinder hole 5 in proximity to the opened end of the cylinder hole 5. A second ring, groove 11 having a predetermined cross section is provided adjacent to the first ring, groove 10. The cross section of the second ring, groove 11 is larger than that of the first ring groove 10. A ring-shaped dust seal member 12 of elastic material such as rubber, having, a square cross section corresponding to that of the first ring groove 10, is slidable and in close contact with the outer circumferential surface of the pistons 4, 4. The ring-shaped dust seal member 12 is attached to the first ring groove 10. Further, a ring-shaped brake-gap adjustment seal member 13, having a square cross section corresponding to that of the second ring groove 11, in slidable and in close contact with the outer circumferential surface of the pistons 4, 4 The ring,-shaped brake-gap adjustment seal member 13 is attached to the second ring groove 11.

At least inner circumferential surfaces of the dust seal member 12 and the brake-gap adjustment seal member 13 are coated with a friction reducing agent 14 having a chemical resistant characteristic As the friction reducing agent 14, an arbitrary agent selected from materials such as fluorine materials, silicone materials and urethane materials can be used as long as it has a chemical resistant characteristic. The thickness of the coat layer is appropriately 2 to 20 μm.

Next, the operation of the embodiment will be described.

Assuming that the master cylinder (not shown) is operated to supply its output hydraulic pressure to the hydraulic chambers 8, 8 of the brake caliper 6, the pistons 4, 4 move forward by the hydraulic pressure to bring the friction pads 3, 3 against both of the side surfaces of the brake disc 2. The friction force brakes the brake disc 2, i.e., the wheel to which the brake disc is connected.

The dust seal member 12 attached to the first ring groove 10 of the brake caliper 6 is in close contact with the outer circumferential surface of each piston 4, to prevent the intrusion of dust, rain and the like into the hydraulic chamber 8. As the inner circumferential surface of the dust seal member 12 is coated with the friction reducing agent 14, even if the hardness and fastening allowance of the dust seal member 12 change due to temperature change, the friction coefficient of the seal member 12 to the piston 4 can be stabilized. Accordingly, the seal function can always be normally performed, and the sliding resistance of the piston 4 can be reduced.

Further, the brake-gap adjustment seal member 13 attached to the second ring groove 11 of the brake caliper 6 is roll-deformed by friction in accordance with the forward movement of the piston 4 upon application of pressure to the hydraulic chamber 8, and the seal member is rolled-back upon pressure reduction in the hydraulic chamber 8 to withdraw the piston 4 by a minute stroke, to cause a constant brake gap between the respective friction pads 3 and the brake disc 2, thereby avoiding drag of the respective pads 3 As the inner circumferential surface of the seal member is coated with the friction reducing agent 14, even if the hardness and fastening allowance of the dust seal member 13 change due to temperature change, the friction coefficient of the seal member 13 to the piston 4 can be stabilized, and accordingly, the roll back amount of the seal member 13 can always be constant, and the brake gap can be stabilized.

Further, the coating of the friction reducing agent 14 can be performed only in an extremely small region, i.e., each inner circumferential surface of the dust seal member 12 and the brake-gap adjustment seal member 13, and can be easily made by brush coating, spray coating or the like. Consequently, the increase in the costs of the disc brake by this coating is extremely small.

Next, a method of manufacturing the dust seal member 12 and the brake-gap adjustment seal member 13 with inner circumferential surfaces coated with the friction reducing agent 14 will be described with reference to FIGS. 2(A)–2(C).

Figure 2A:
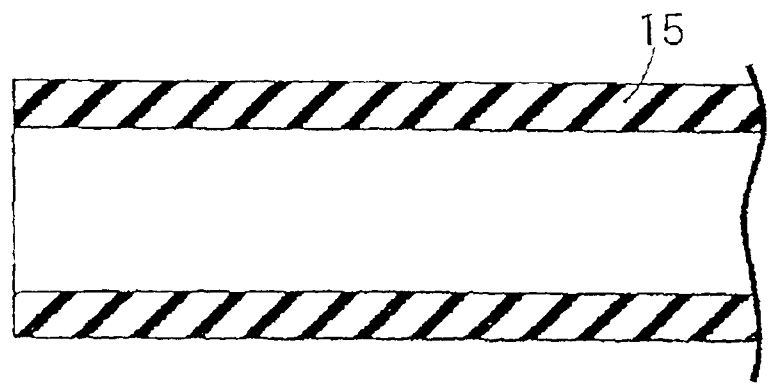
Figure 2B:
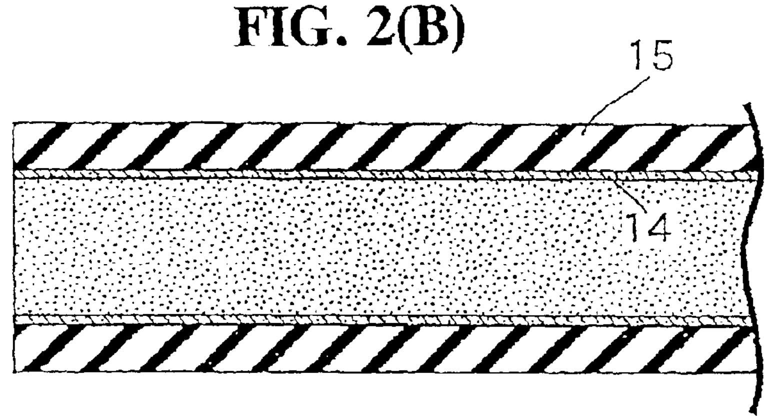
Figure 2C:
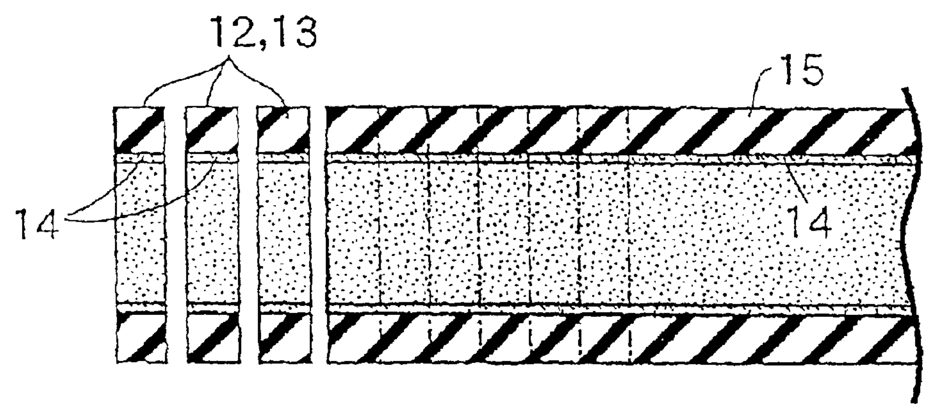

As shown in FIG. 2(A), first, a cylindrical seal material 15 of elastic material such as rubber, having the same inner and outer diameters as those of the dust seal member 12 and the brake-gap adjustment seal member 13, is formed. Next, as shown in FIG. 2(B), the inner circumferential surface of the cylindrical seal material 15 is coated with the friction reducing agent 14 by brush coating, spray coating or the like. Then as shown in FIG. 2(C), the cylindrical seal material 15 is cut into rings. Thus, multiple dust seal members 12 and brake-gap adjustment seal members 13 can be efficiently manufactured. Especially, as the coating of the friction reducing agent 14 can be performed only once per one seal material 15, the increase in the costs of one disc brake by the coating is further extremely small.

The present invention is not limited to the above embodiment, but various design changes can be made without departing from the scope thereof. For example, only one of the dust seal member 12 and the brake-gap adjustment seal member 13 may be coated with the friction reducing agent 14. Further, in the above embodiment, the present invention is applied to an opposed piston type disc brake 1 having the pair of left and right hydraulic chambers 8, however, the present invention may be applied to a pin slide type disc brake having a hydraulic chamber on one side.

Next, other techniques which can attain similar effects to those of the above seal members 12 and 13 with inner circumferential surfaces coated with the friction reducing agent (14) will be described.

(1) A chemical friction reduction processing is performed on a seal member. For example, fluorine atoms, chlorine atoms and the like are chemically combined with the inner circumferential surface of the seal member. This provides the inner circumferential surface of the seal member with high lubrication, high water repellency, and non-adhesion characteristic.

(2) A plastic film of PTFE, PET, PE, PP or the like is attached to the inner circumferential surface of the seal member. This enables simple setting of film thickness, and provides the inner circumferential surface of the seal member with high lubrication, and non-adhesion and chemical resistant characteristics.

(3) Upon formation of a seal member, a friction reducing agent of fluorine or other material is mixed with the material of the seal member.

(4) Note that if friction reduction processing similar to the above is performed on the piston seal member of the master cylinder, the operation resistance of the piston can be reduced, and the brake operation feeling can be improved.

As described above, according to the first aspect of the present invention, in the disc brake piston seal member, attached to the ring groove formed in the inner circumferential surface of the cylinder hole of the brake caliper, and in slidable and close contact with the outer circumferential surface of the piston slidably engaged with the cylinder hole, at least the inner circumferential surface in close contact with the outer circumferential surface of the piston is coated with the friction reducing agent. Accordingly, even if the hardness and fastening allowance of the piston seal member changes due to temperature change, the original seal function and brake-gap adjustment function of the seal member can always be stabilized Further, the coating of the friction reducing agent can be made only in an extremely small region, i.e., the inner circumferential surface of each piston, further can be easily performed by brush coating, spray coating or the like. Accordingly, a cost reduction can be made in comparison with a conventional piston with a plated outer circumferential surface.

Further, according to the second aspect of the present invention, upon manufacture of the above piston seal member, the inner circumferential surface of a cylindrical seal material is coated with the friction reducing agent, and then the seal material is cut into rings, thus multiple piston seal members are manufactured. Accordingly, the piston seal members coated with the friction reducing agent on inner circumferential surfaces can be efficiently manufactured. Especially, the coating of the friction reducing agent can be performed only once per one seal material, thus a cost reduction can be more effectively attained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for manufacturing a disc brake piston seal member comprising the following steps:

providing a cylindrical seal material of an indeterminate length, said cylindrical seal material including an inner circumferential surface and an outer circumferential surface;

coating the inner circumferential surface of said cylindrical seal material with the friction reducing agent; and cutting said seal material into ring pieces for manufacturing multiple piston seal members.

2. The method for manufacturing a disc brake piston seal member according to claim 1, wherein said cylindrical seal material is rubber.

3. The method for manufacturing a disc brake piston seal member according to claim 1, wherein said friction reducing agent is selected from the group consisting of fluorine materials, silicone materials and urethane materials.

4. The method for manufacturing a disc brake piston seal member according to claim 1, wherein said friction reducing agent is coated to a thickness of approximately 2 to 20 $\mu$m.

5. The method for manufacturing a disc brake piston seal member according to claim 1, wherein said friction reducing agent is a plastic film, selected from a group consisting of PTFE, PET, PE, and PP.

6. A method for manufacturing a disc brake piston seal member comprising the following steps:

providing a cylindrical seal material of an indeterminate length, said cylindrical seal material including an inner circumferential surface and an outer circumferential surface;

performing a chemical friction reduction process on the inner circumferential surface of said cylindrical seal material; and cutting said seal material into ring pieces for manufacturing multiple piston seal members.

7. The method for manufacturing a disc brake piston seal member according to claim 6, wherein said cylindrical seal material is rubber.

8. The method for manufacturing a disc brake piston seal member according to claim 6, wherein fluorine atoms or chlorine atoms are chemically combined with the inner surface of the seal member, thus providing the inner circumferential surface with high lubrication, high water repellancy, and non-adhesion characteristics.

9. A method for manufacturing a disc brake piston seal member comprising the following steps:

providing a cylindrical seal material of an indeterminate length, said cylindrical seal material including an inner circumferential surface and an outer circumferential surface; and cutting said seal material into ring pieces for manufacturing multiple piston seal members, wherein upon formation of a seal member, a friction reducing agent of fluorine or other material is mixed with the material of the seal member.

* * * * *